Dec. 15, 1970   HIROSHI HATTA   3,546,806
MEANS TO ATTRACT FISH
Filed Feb. 10, 1969
2 Sheets-Sheet 1
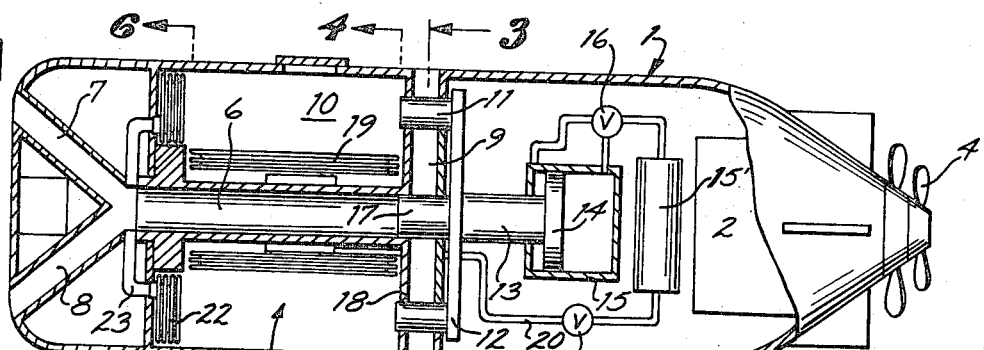
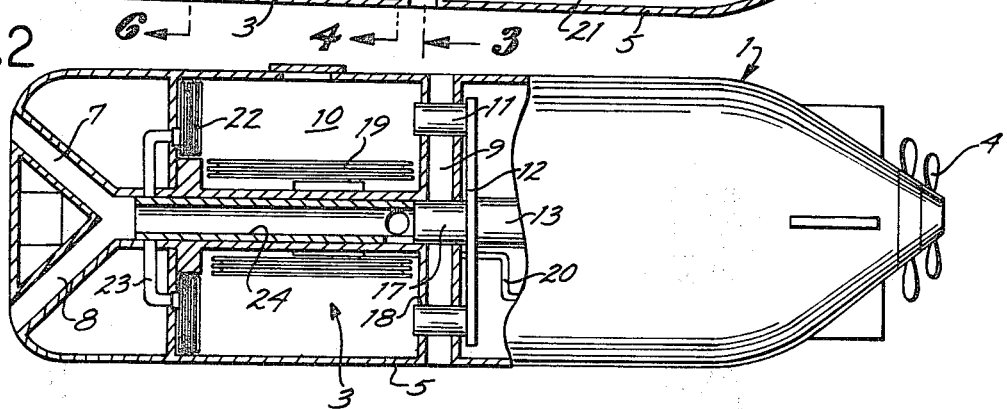
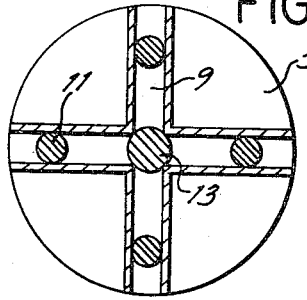
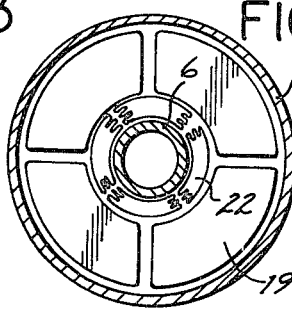
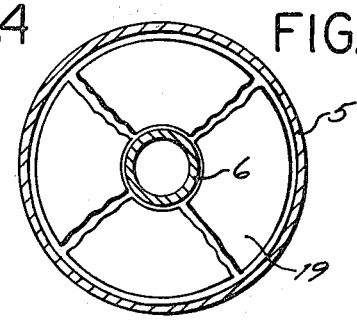
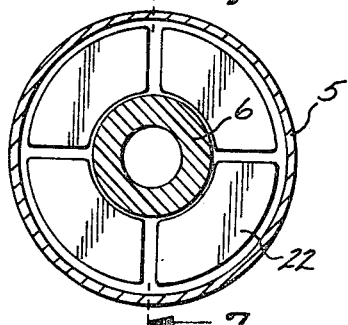
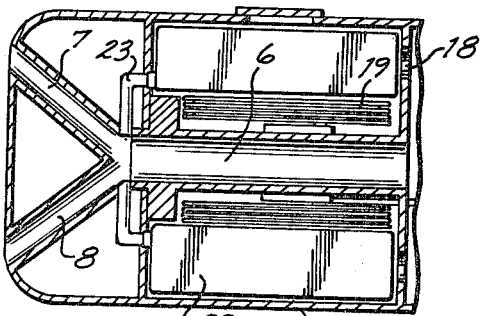
INVENTOR.
HIROSHI HATTA
BY
ATTORNEY

United States Patent Office 3,546,806
Patented Dec. 15, 1970

3,546,806
MEANS TO ATTRACT FISH
Hiroshi Hatta, 15–16 Minami Seiwaen-cho,
Osaka, Japan
Filed Feb. 10, 1969, Ser. No. 797,875
Int. Cl. A01k *97/02*
U.S. Cl. 43—44.99                                6 Claims

ABSTRACT OF THE DISCLOSURE

Self driven apparatus in the nature of a boat or tank, and which can be remotely controlled from a fishing boat, and which will eject bait when activated by the operator on the fishing boat. The bait scattering apparatus can also be caused to move either on the surface of the water or below the surface, as is most expedient.

---

An object of my invention is to produce an apparatus which will attract fish in a wide area of the sea, causing them to congregate in a given area where they can be caught by the fishermen. The apparatus consists of a self-propelled bait scattering means which will automatically scatter bait in the water, either continuously or intermittently, as controlled by the operator. Heretofore, fish attracting structures have consisted either of a row or series of electric lamps which have been towed through the water by the fishing boat, or the bait has been scattered in the water by means of an exploding bomb containing the bait within it.

Another object of my invention is to provide a novel self-propelled bait containing tank or apparatus which is not limited by the length of a tow rope or other towing means, but my apparatus is not confined to a limited area but can be caused to range over a wide area of the sea.

Other objects, advantages and features of this invention may appear from the accompanying drawings, the subjoined detailed description and the appended claims.

In the drawing:

FIG. 1 is a longitudinal sectional view of the bait scattering apparatus employing my invention.

FIG. 2 is a plan view of my bait scattering apparatus with parts broken away to show interior construction, and illustrating a slightly modified type of valve.

FIG. 3 is a sectional view taken on line 3—3 of FIG. 1.

FIG. 4 is a sectional view taken on line 4—4 of FIG. 1.

FIG. 5 is a view similar to FIG. 4 but showing a sectional view through the expanding bellows.

FIG. 6 is a sectional view taken on line 6—6 of FIG. 1.

FIG. 7 is a fragmentary longitudinal sectional view of the body portion of the bait scattering apparatus again showing a control valve in the retracted position.

Figure 8:
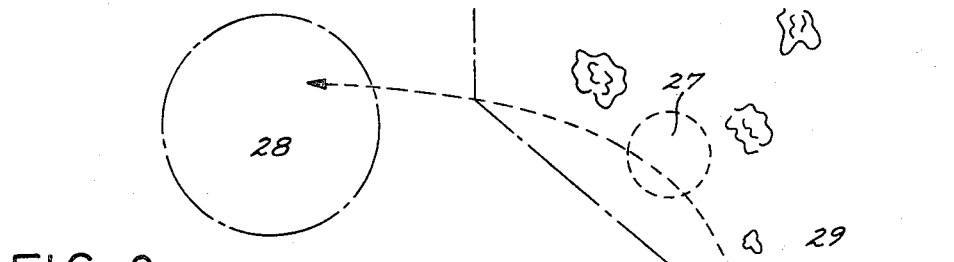
FIG. 8 is a diagrammatic view illustrating one way of controlling a bait scattering tank.

As illustrated in FIG. 1 the self-propelled bait scattering apparatus 1 comprises a driving mechanism 2 and a bait scattering apparatus 3. The driving mechanism 2 is provided with a depth regulator and also propelling screws 4, all of which is usual and well known and the details thereof form no part of this invention. This apparatus is mounted within a suitable body 5 of appropriate shape; however, it is here shown as substantially cylindrical. The body 5 is adapted to either move on the surface of the water or submerged, as desired by the operator.

The bait scattering apparatus 3, which is positioned within the housing 5, is composed of a water admitting pipe 6 which extends from the water inlet pipes 7–8. The water inlet pipes 7–8 are open to the forward end of the housing 5 so as to receive water when the apparatus is driven forwardly by the propellers 4. The water is thus forced into the pipe 6 and thence to the rearward end of this pipe to a plurality of outlet pipes 9.

The bait tank 10 surrounds the pipe 6 within the housing 5 and this tank is loaded with bait before the apparatus is employed. The bait tank 10 extends substantially the full length of the water intake pipe 6, as shown in FIGS. 1 and 2. To control the emission of bait from the tank 10 to the outlet pipes 9, I provide a plurality of pin type valves 11, one in each of the outlet pipes 9. The pin type valves 11 are each attached to a spider base 12, which base is attached to a rod 13. The rod 13, in turn, is attached to a piston 14 in the cylinder 15, which piston is moved horizontally by air pressure from a pressure tank 15'. The control valve 16 is electronically controlled from a remote source, such as the fishing boat, and this valve controls the admission of air into the cylinder 15 to drive the piston 14 back and forth and to thus retract the valves 11 as required. The spider 12 also carries a block 17 which opens and closes the inner end of the pipe 6 and controls the flow of water into the radial outlet pipes 9 when the valves 11 are retracted and water is permitted to flow out radially from the housing 5. When the valves 11 are retracted they open the ports 18 into the bait tank 10, thus permitting bait to flow from the bait tank and thence into the radial outlet pipes 9, and the bait is thus scattered in the water.

To force the bait from the bait tank into the outlet pipes 9, I provide an annular bellows 19 which is expanded through the air pipeline 20 when the valve 21 is actuated from a remote source, such as the fishing boat. A second extruding bellows 22 is provided at the forward end of the bait tank 10 and is expanded by the pressure of water through the pipes 23 which extend from the intake pipe 6 and thence to the bellows 22. The air pressure from the tank 15' to the bellows 19 may also be controlled by a sleeve valve 24 which is attached to the pin valve 17 and is moved horizontally to open and close the pipeline 20, as desired by the operator.

The bellows 19 is used to extrude water from the bait tank 3 in order that the entire bait scattering mechanism may be caused to float to the surface. When the engine 2 is stopped no water is being driven into the intake pipe 6 and the outlet pipes 9. Consequently, the valve pins 11 can be left in a retracted position. Thereupon by activating the valve 21 the air pressure will expand the bellows 19, thus forcing water out of the bait tank 3 through the outlet pipes 9 and thus reducing the weight of the entire assembly to permit it to float to the surface. Thereupon it can be retrieved by the fishing vessel.

In the diagrammatic drawing, shown in FIG. 8, the fishing boat 25 will lower the bait scattering apparatus 1 and direct it in the path 26. If the school of fish is in the area 27 the bait can be scattered in this area and then continued to the area 28, which might be in deep water where the fishing boat 25 can move. This is an example of where the school of fish 27 might be in a shoal area 29 which would be dangerous for the fishing vessel 25.

Figure 9:
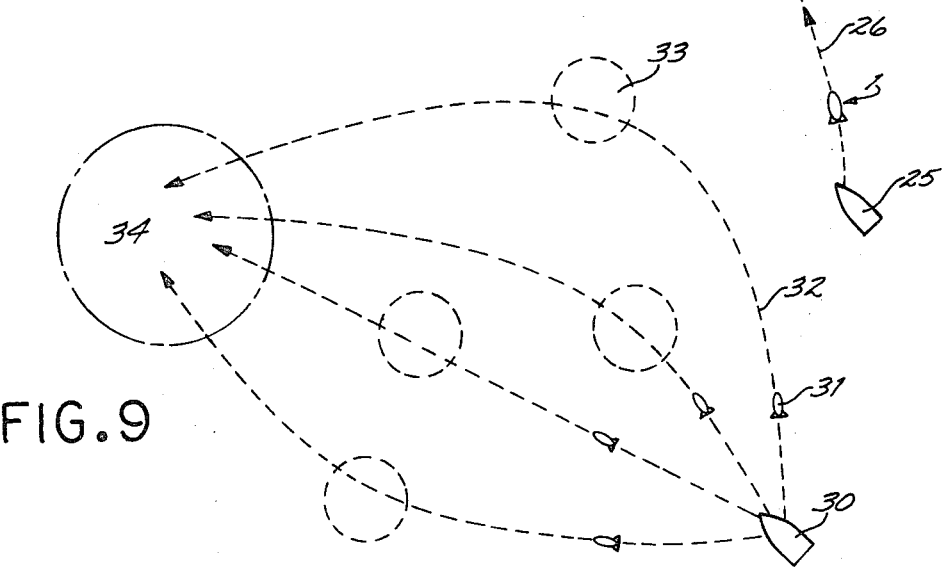
FIG. 9 is a diagrammatic view of another way of controlling the bait scattering tank.

In the schematic drawing shown in FIG. 9, the fishing, boat 30 can lower a plurality of bait scattering apparatuses, 31, each of which move in a separate path 32 to move through a school of fish 33. The bait scattering apparatuses all converge in an area 34 which is then traversed by the fishing boat 30 to catch the fish.

Figure 10:
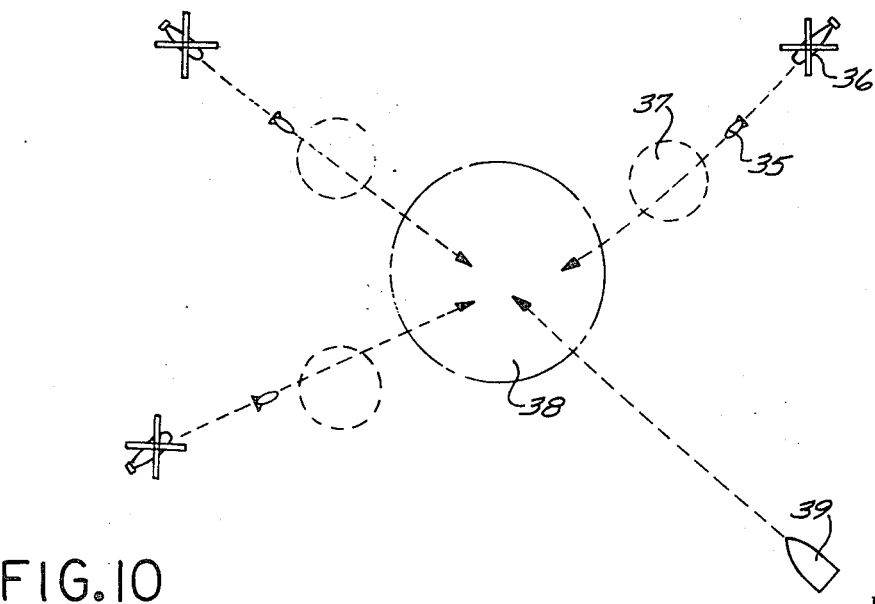
FIG. 10 is a diagrammatic view of still another way of controlling the bait scattering apparatus by means of aircraft.

In the diagrammatic drawing shown in FIG. 10, several bait scattering devices 35, of the type previously described, are dropped from separate aircraft 36. Each aircraft observes a separate school of fish 37 and directs the bait scattering apparatus 35, then continues to a central collection area 38, which is subsequently entered by the fishing boat 39 to net the fish.

Having described my invention, I claim:

1. A bait scattering means comprising a hull, drive means on said hull, bait scattering means on said hull, and means in the hull connected to the bait scattering means to propel bait to the bait scattering means, and said bait scattering means comprising a pipe extending from an inlet at the prow of the hull to an outlet aft of the prow.

2. A bait scattering means comprising a hull, drive means on said hull, bait scattering means on said hull, and means in the hull connected to the bait scattering means to propel bait to the bait scattering means, and said means to propel bait comprising a bait tank, and an expandable bellows in the bait tank to eject the bait.

3. A bait scattering means comprising a hull, drive means on said hull, bait scattering means on said hull, and means in the hull connected to the bait scattering means to propel bait to the bait scattering means, and said bait scattering means comprising a pipe extending from an inlet at the prow of the hull to an outlet aft of the prow, and said means to propel bait comprising a bait tank, and an expandable bellows in the bait tank to eject the bait.

4. A bait scattering means comprising a hull, drive means on said hull, bait scattering means on said hull, and means in the hull connected to the bait scattering means to propel bait to the bait scattering means, and said means to propel bait comprising a bait tank, and an expandable bellows in the bait tank to eject the bait, a second expandable bellows in the bait tank, and means to control the expansion of the second expandable bellows.

5. A bait scattering means comprising a hull, drive means on said hull, bait scattering means on said hull, and means in the hull connected to the bait scattering means to propel bait to the bait scattering means, and said means to propel bait comprising a bait tank, and an expandable bellows in the bait tank to eject the bait, a second expandable bellows in the bait tank, and means to control the expansion of the second expandable bellows, said means to control the expansion of the second bellows including an air pressure tank, a pipe extending from the tank to the bellows, and a valve means in said pipe.

6. A bait scattering means comprising a hull, drive means on said hull, bait scattering means on said hull, and means in the hull connected to the bait scattering means to propel bait to the bait scattering means, and said bait scattering means comprising a pipe extending from an inlet at the prow of the hull to an outlet aft of the prow, and said means to propel bait comprising a bait tank, and an expandable bellows in the bait tank to eject the bait, and a pipe extending from the first named pipe to said bellows to expand said bellows.

References Cited

UNITED STATES PATENTS

| 848,101 | 3/1907 | Hale | 43—44.99X |
| 2,582,015 | 1/1952 | Duncan, Jr. | 43—17.5X |
| 3,237,339 | 3/1966 | Rice | 43—44.99 |

WARNER H. CAMP, Primary Examiner